United States Patent

[11] 3,567,953

| [72] | Inventor | Bruno Lord<br>Lac Bellemare, St. Mathieu, Province of Quebec, Canada |
|---|---|---|
| [21] | Appl. No. | 805,681 |
| [22] | Filed | Mar. 10, 1969 |
| [45] | Patented | Mar. 2, 1971 |

[54] TIDE-OPERATED POWER PLANT
2 Claims, 5 Drawing Figs.

[52] U.S. Cl. .................................................. 290/42, 290/53
[51] Int. Cl. .................................................. F03b 13/12
[50] Field of Search.................................... 290/42, 43, 53, 54

[56] References Cited
UNITED STATES PATENTS

| 163,451 | 5/1875 | Buckner | 290/53X |
| 523,429 | 7/1894 | Johnson | 290/53 |
| 975,157 | 11/1910 | Quedens | 290/42 |
| 975,726 | 11/1910 | Sharpneck | 290/42 |
| 987,685 | 3/1911 | Atkinson | 290/42 |
| 1,393,472 | 10/1921 | Williams | 290/42 |
| 1,864,499 | 6/1932 | Grigsby | 290/42 |

*Primary Examiner*—G. R. Simmons
*Attorney*—Pierre Lesperance

ABSTRACT: A tide-operated power plant consisting of an electric generator mounted on a float, a driving train for said generator, including a reverse and operated by a member stationary with respect to the water bottom, whereby up-and-down movement of the float will drive the generator.

PATENTED MAR 2 1971

INVENTOR
Bruno LORD

BY Pierre Lesperance
AGENT 3,567,953

TIDE-OPERATED POWER PLANT

The present invention relates to a tide-operated power plant more particularly of the type in which a dynamo, mounted on a float, is actuated by the vertical movement of the float.

Tide-operated power plants have been known for a long time and more especially plants of the above-mentioned type, as shown in U.S. Pat. No. 523,429 to G.A. Johnson, dated Jul. 24, 1894. However, in this patent, power is generated only during a rising tide and no means are provided for generating electricity when the tide remains at constant level. The system is therefore far from efficient.

Another type of tide-operated plant is shown in U.S. Pat. No. 3,011,062, dated Nov. 28, 1961. However, this power plant necessitates the construction of a special dynamo which is very expensive.

It is the general object of the present invention to provide a tide-operated power plant of the character described, which obviates the above disadvantages.

A more specific object of the present invention resides in the provision of a power plant of the character described, which may generate electricity during the falling as well as during the rising of the tide and also during the time when the tide is at high and low constant level, whereby a substantially constant amount of electricity can be generated by the system of the invention.

Another object of the present invention resides in a power plant of the character described which can be installed anywhere along the sea coast, does not necessitate the construction of large scale dikes or dams, use no water turbine, in which the mechanism is protected from sea water and in which the elements can be manufactured at one side and towed to another site, resulting in the flexibility of the system and the possiblity of installing power plants close to any main city located near the sea coast, and therefore eliminating long transmission lines.

Another object of the present invention resides in the provision of a power plant of the character described, in which part of the structure may be so designed that it can also be used as a bridge for road traffic.

The foregoing and other objects of the present invention will become more apparent during the following disclosure and by referring to the drawings, in which.

In the drawings, like reference characters indicate like elements throughout.

Figure 1:
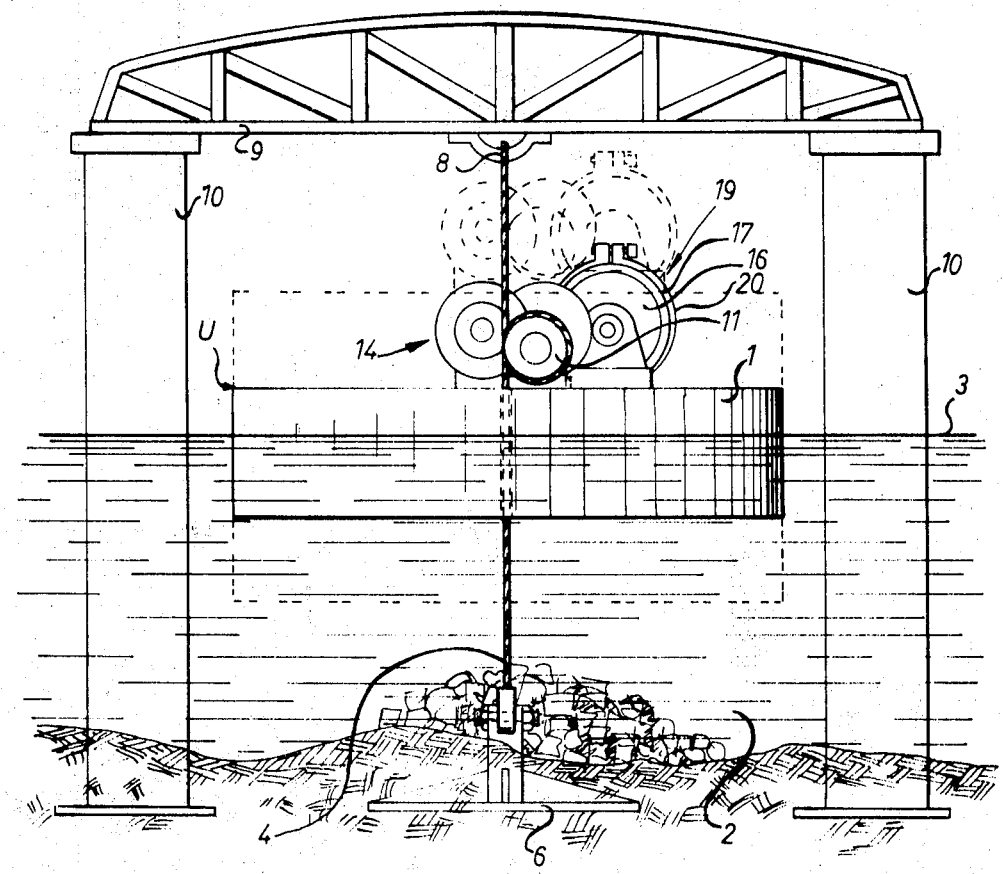
FIG. 1 is a somewhat schematic elevation of a first embodiment of the tide-operated power plant in accordance with the invention.
Figure 3:
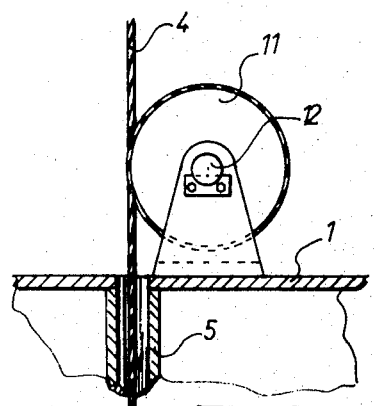
FIG. 3 is a partial section of the float and cable-receiving drum of the first embodiment.
Figure 4:
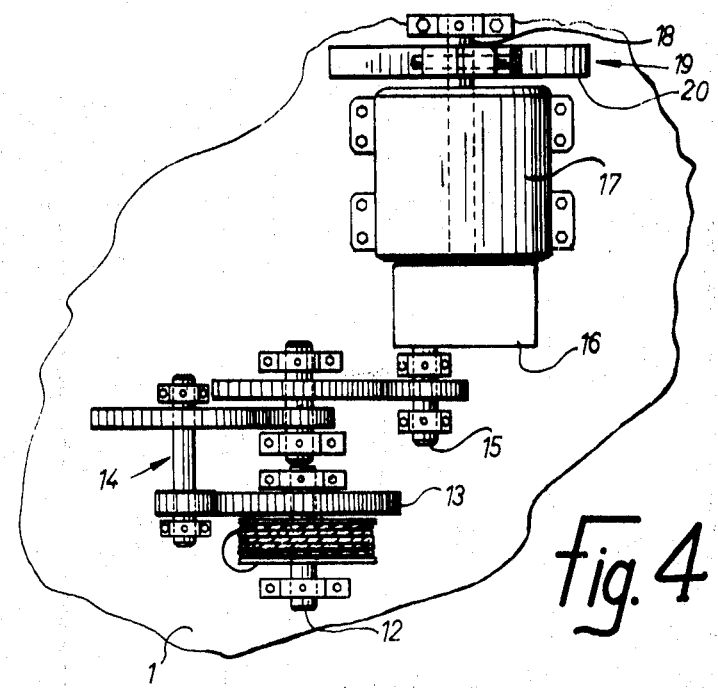
FIG. 4 is a top plan view of the dynamo, gear train and cable-receiving drum of the first embodiment.

Referring to FIGS. 1, 3, and 4 which show a first embodiment, a float 1, which may be of considerable size if so desired, floats in tidal water 2, the level of which is indicated at 3.

A cable 4 extends freely through a passage 5 made in the float 1. One end of the cable is attached to an anchor 6 firmly anchored in the water bottom 7, while the other end of cable 4 is firmly attached at 8, well above the maximum tide level, to the underside of the middle of a beam 9 which may be made of truss work, said beam 9 supported at its two ends on pillars 10 supported on the water bottom 7 and firmly anchored therein.

The intermediate portion of cable 4 is wound several turns on a drum 11 mounted on top of float 1 for rotation about a horizontal axis. The arrangement may be that shown in FIG 4, wherein the shaft 12 of the drum carries a gear 13, itself adapted to drive a gear train 14 forming a speed multiplying device rotating shaft 15 at a much greater speed than the speed of rotation of drum 11.

This shaft 15 constitutes the input shaft of a reverse mechanism of any type enclosed in casing 16 and which may be operated automatically or manually. The output shaft of the reverse mechanism drives a conventional dynamo 17, also mounted on float 1. The shaft 18 of the dynamo can be slowed down by a conventional braking system 19, which is preferably actuated by centrifugal force. The braking system 19 may be of the type comprising a flywheel mounted on the shaft 18 of the dynamo and surrounded by a brake shoe arrangement 20, itself actuable to engage the flywheel by a conventional centrifugally responsive mechanism, not shown.

The whole assembly is preferably located close to shore at any suitable location where it will be subjected to tide.

With rising tide, the float 1 moves upwardly together with the drum 11 and dynamo 17, while the cable 4 remains attached to the stationary beam 9 and anchored in the water bottom. Therefore, drum 11 is caused to rotate and the dynamo 17 is driven at a much higher speed of rotation than that of the drum 11, due to the speed multiplication gear train 14.

When the tide is falling, the weight of float 1 and of the mechanism carried thereby is sufficient to cause also rotation of dynamo to produce electricity. In this case, the reverse mechanism is thrown into reverse drive position so that the dynamo will turn in the same direction, both upon rising and falling tide. Naturally, the float 1 must have sufficient buoyancy to not only support the mechanism and the dynamo which is installed thereon but also to overcome the resisting force exerted on cable 4 by the rotating electricity generating dynamo 17. At the same time, the dead weight of the float 1 and gear supported thereby must be sufficient to cause rotation of the dynamo 17 under load when the tide is falling.

During rising or falling of the tide, the braking system 19 slows down the speed of rotation of the armature of the dynamo 17, so as to restore potential energy in the system, which is released at high and low tide when the water level stays stationary for a few minutes. Thus, substantially uniform electricity output can be obtained from the dynamo.

It will be appreciated that slowing down of the dynamo 17 when the tide is rising, will cause the float 1 to sink in the water, so that its normal flotation line will be below water level 3, and, inversely, when the tide is falling, the float 1 will have its normal flotation line above water level 3. Thus, in both cases, potential energy is stored in the system. When the tide approaches low or higher level, the rate of falling or rising of the tide is slowed down and, therefore, the brake system is released, said brake system being dependent for its operation on the speed of rotation of the dynamo rotor.

Obviously, the braking system 19 could be operated by means sensitive to the speed of rising or lowering of the tide in combination with means giving the time during which the water level remains constant at high and low tide, the idea being to obtain as uniform power output as possible. Obviously, the braking system could be applied to other parts of the dynamo driving system than to the dynamo shaft itself.

The reverse mechanism in casing 16 may be operated either manually or automatically in accordance with a control sensitive to the instantaneous vertical direction imparted to the float by the combined tide and wave action.

It should be noted that gear 9 and pillars 10 can be used as part of a bridge for motor traffic, depending on the location of the power plant.

It should also be noted that the float 1 is retained by cable 4 against horizontal displacement under the action of waves, wind and water current. Obviously other guiding cables could be arranged at the periphery of the float 1 to further guide the same in its up-and-down movement and to prevent its rotation, said guiding wires or cables attached to the water bottom and to the beam 9 and extending through eyes or other means secured to the float 1.

Float 1 and associated cable 4, anchor 6, drum 11, gear train 14 and dynamo 17 form a unit U which is a tide-operated electric power plant. There might be several units U, each arranged between pillars 10' supporting a beam 9', beam 9' being common to all of the cables 4 of the units U, as shown in FIG. 5.

Figure 5:
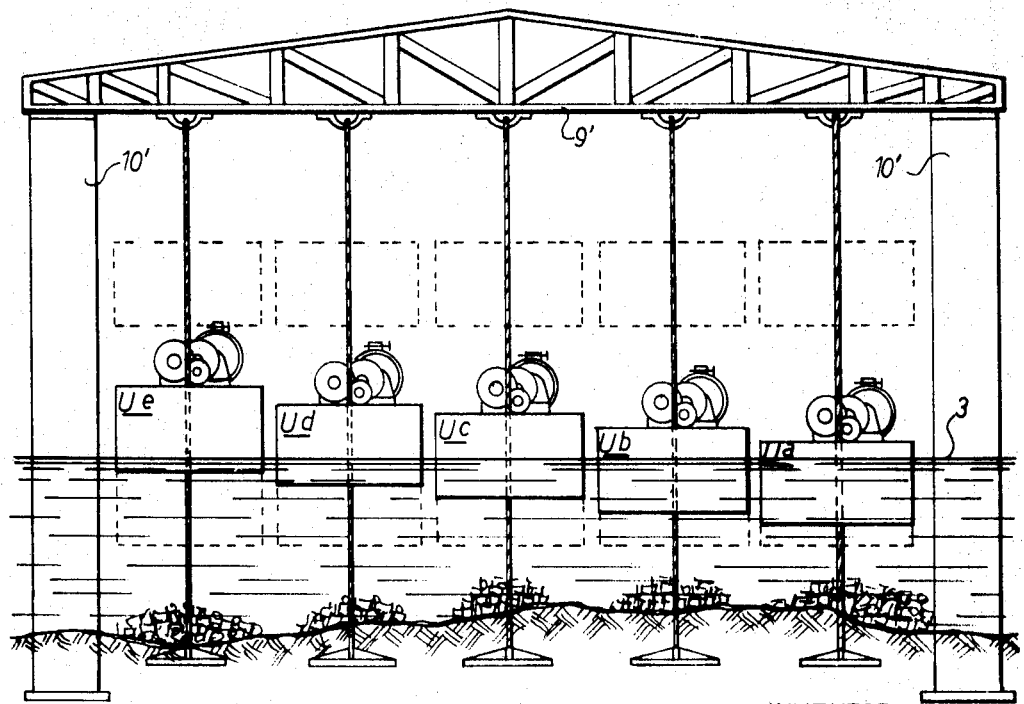
FIG. 5 is a schematic side elevation of several float and dynamo units in accordance with the first embodiment mounted as an assembly, each unit cooperating with the other.

FIG. 5 also shows that the several units U may be operated at different falling and rising speeds, this being obtained by differentially controlling the braking system 19 of each unit U. With this arrangement, one can obtain more uniform power output of the several units U, the dynamos of which feed electricity to a common transmission line. This arrangement will be used to advantage during the periods of the year when the water level at low and high tide remains constant for an appreciable time, for instance 1 hour.

The following is a typical manner of operation. Referring to FIG. 5, wherein water level 3 has not yet reached low tide level, and supposing the sea water level will remain constant at low tide for 1 hour, say from 6:00 a.m. to 7:00 a.m., in this case unit Ua would be slowed down by its braking system such as to be stopped from 6:00 a.m. to 6:15 a.m.

Unit Ub will be slowed down to be stopped from 6:15 to 6:30 a.m.; unit Uc will be slowed down or braked to be stopped between 6:40 to 6:45 a.m.; and unit Ud will be slowed down to be stopped between 6:45 to 7:00 a.m. Thus, the hour during which the sea remains at constant level at low tide will be divided into four equal parts of 15 minutes each between units Ua, Ub Uc, and Ud. The same operation is effected at high tide.

Unit Ue will be mostly used to store potential energy which can be released to produce electricity during the time in which units Ua, Ub, Uc, and Ud will not be operating. Thus, power unit Ue will be slowed down sufficiently to operate during all of the time the sea will remain at constant level during low tide and high tide.

With this arrangement, the five units will produce electricity at a uniform rate corresponding to the equivalent of four units out of five. Alternatively, the five units may be all operated at equal falling and rising speeds and in such a manner as to release potential energy in sufficient quantity during the time the water level remains steady, so as to produce electricity during all this time.

Figure 2:
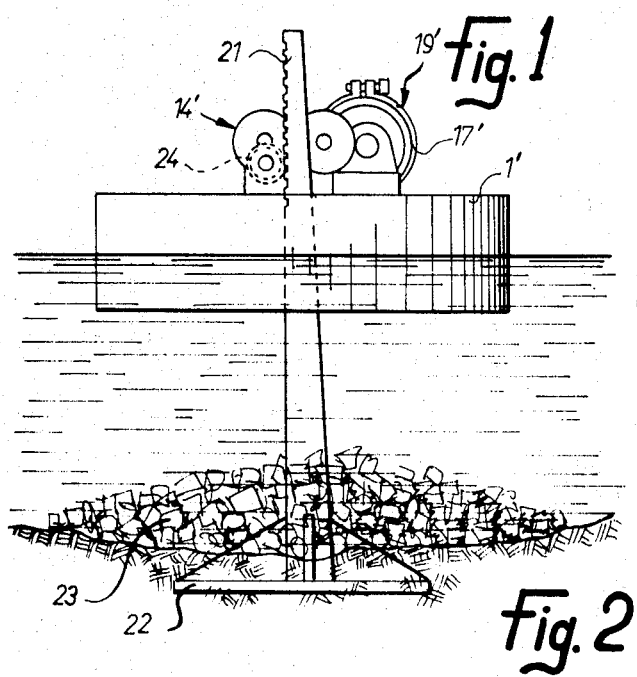
FIG. 2 is a schematic side elevation of a second embodiment.

FIG. 2 shows another embodiment of the invention in which all overhanging structure has been eliminated.

A rack bar 21 is firmly anchored in the sea bed 7 by means of suitable anchor place 22 secured to the rack 21 and loaded down, for instance, by means of stones 23. The rack is thus kept in upright position and extends through a suitable passage made in the flat 1' and engages a pinion 24 which drives the dynamo 17' through a gear train 14', which acts as a speed multiplying device, where the dynamo is driven at greater speed than the speed of rotation of the pinion 24. The dynamo 17' is provided with a braking device 19', as in the first embodiment.

This system operates in the same manner as the first embodiments and will generate electricity at a substantially uniform rate and during falling as well as rising tide and during the time the water level remains constant at low and high tide by proper operation of the braking system 19'.

Drum 11 and pinion 24 are rotary input members for the driving train of the respective dynamos 17 and 17'. Cable 4 and rack 21 are members resisting vertical displacement in both directions under forces exerted thereon by the input member.

I claim:

1. A tide-operated power plant comprising a float, means for generating electricity mounted on said float and including a rotary part, a driving train connected to said rotary part and including a rotary input member, said driving train mounted on said float whereby said input member will accomplish an oscillating vertical movement with the rise and fall of the tide, a member anchored in the water bottom engaging said input member and resisting vertical displacement in both directions under forces exerted thereon by said input member, thereby converting rectilinear up-and-down movement of said float to rotational movement of said input member in both directions of rotation, a reverse mechanism operative when said float changes the direction of its vertical movement, so that said rotary part of said means for generating electricity, always rotates in the same direction, and braking means mounted on said float and acting on said rotary part to slow down the rotation of said rotary part to thereby retard the up-and-down movement of said float with respect to the rate of rising and of falling of the tide and thus to maintain the float below its normal flotation level during rising of the time and above its normal flotation level during falling of the tide, whereby the flotation forces exerted on the float and the dead weight of the float and of the elements supported thereon, are stored as potential energy to be released by the release of said braking means when the water level remains level at high and low tide, thus enabling the float to continue to rise or fall and to continue generating electricity when the tide is at rest.

2. A tide-operated power plant as claimed in claim 1, wherein said rotary input member is a drum and said member anchored in the water bottom includes a cable anchored in the water bottom extending through said float, wound on said drum and extending vertically upwardly from said drum, and a stationary structure having a portion overlying said float and drum, the upper end of said cable attached to said structure portion.